United States Patent
Hong

(10) Patent No.: US 10,691,940 B2
(45) Date of Patent: Jun. 23, 2020

(54) METHOD AND APPARATUS FOR DETECTING BLINK

(71) Applicant: Baidu Online Network Technology (Beijing) Co., Ltd., Beijing (CN)

(72) Inventor: Zhibin Hong, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 152 days.

(21) Appl. No.: 16/129,356

(22) Filed: Sep. 12, 2018

(65) Prior Publication Data
US 2019/0205607 A1 Jul. 4, 2019

(30) Foreign Application Priority Data
Dec. 29, 2017 (CN) .......................... 2017 1 11475427

(51) Int. Cl.
*G06K 9/00* (2006.01)
*G06T 7/33* (2017.01)
(Continued)

(52) U.S. Cl.
CPC ....... *G06K 9/0061* (2013.01); *G06K 9/00268* (2013.01); *G06K 9/00335* (2013.01); *G06K 9/00604* (2013.01); *G06K 9/6274* (2013.01); *G06T 7/33* (2017.01); *G06T 7/74* (2017.01); *G06T 2207/10016* (2013.01);
(Continued)

(58) Field of Classification Search
CPC ............... G06K 9/0061; G06K 9/6274; G06K 9/00335; G06K 9/00604; G06K 9/00268; G06K 9/4604; G06K 9/00281; G06T 7/74; G06T 7/33; G06T 2207/20081;
(Continued)

(56) References Cited

U.S. PATENT DOCUMENTS 8,885,882 B1 * 11/2014 Yin .......................... G06F 3/00
382/103
2014/0016093 A1 * 1/2014 Korb ...................... A61B 3/101
351/206
(Continued)

OTHER PUBLICATIONS

Morris, Tim, Paul Blenkhorn, and Farhan Zaidi. "Blink detection for real-time eye tracking." Journal of Network and Computer Applications 25.2 (2002): 129-143. (Year: 2002).*

*Primary Examiner* — Bobbak Safaipour
(74) *Attorney, Agent, or Firm* — Nixon Peabody LLP

(57) ABSTRACT

A method and apparatus for detecting a blink. An embodiment includes: extracting two frames of face images from a video recording a face; extracting a first to-be-processed eye image and a second to-be-processed eye image respectively from the two frames of face images, and aligning the first to-be-processed eye image with the second to-be-processed eye image through a set marking point, the marking point being used to mark a set position of an eye image; acquiring a difference image between the aligned first to-be-processed eye image and the second to-be-processed eye image, the difference image being used to represent a pixel difference between the first to-be-processed eye image and the second to-be-processed eye image; and importing the difference image into a pre-trained blink detection model to obtain a blink detection label, the blink detection model being used to match the blink detection label corresponding to the difference image.

13 Claims, 5 Drawing Sheets

(51) Int. Cl.
　　　*G06T 7/73*　　　(2017.01)
　　　*G06K 9/62*　　　(2006.01)
(52) U.S. Cl.
　　　CPC .............. *G06T 2207/20021* (2013.01); *G06T 2207/20081* (2013.01); *G06T 2207/20224* (2013.01); *G06T 2207/30201* (2013.01)
(58) Field of Classification Search
　　　CPC . G06T 2207/20021; G06T 2207/10016; G06T 2207/20224; G06T 2207/30201
　　　See application file for complete search history.

(56) References Cited

U.S. PATENT DOCUMENTS

| | | | |
|---|---|---|---|
| 2018/0053103 A1* | 2/2018 | Delgado | A61P 1/00 |
| 2018/0192023 A1* | 7/2018 | Sun | H04N 13/128 |
| 2019/0019046 A1* | 1/2019 | Zhou | G06K 9/6215 |
| 2019/0205622 A1* | 7/2019 | Hong | G06K 9/00228 |
| 2019/0320112 A1* | 10/2019 | Yu | H04N 5/23219 |

* cited by examiner

METHOD AND APPARATUS FOR DETECTING BLINK

CROSS-REFERENCE TO RELATED APPLICATIONS

This application claims priority to Chinese Patent Application No. 201711478427.2, filed with the State Intellectual Property Office of the People's Republic of China (SIPO) on Dec. 29, 2017, the content of which is incorporated herein by reference in its entirety.

TECHNICAL FIELD

Embodiments of the present disclosure relate to the field of computer technology, specifically relate to the field of image recognition technology, and more specifically relate to a method and apparatus for detecting a blink.

BACKGROUND

Facial recognition technology is a computer application research technology, belonging to biometric feature recognition technology. The biological features of a biological individual can not only provide distinctions for the biological individual, but can also determine the physical state of the biological individual. For example, the frequency of blink of a biological individual may be used to determine whether the individual is a living body and whether it is in a fatigue state. Blink may also be used as a judgment condition for unlocking to increase safety.

SUMMARY

The objective of embodiments of the present disclosure is to propose a method and apparatus for detecting a blink.

In a first aspect, the embodiments of the present disclosure provide a method for detecting a blink, including: extracting two frames of face images from a video recording a face; extracting a first to-be-processed eye image and a second to-be-processed eye image respectively from the two frames of face images, and aligning the first to-be-processed eye image with the second to-be-processed eye image through a set marking point, the marking point being used to mark a set position of an eye image; acquiring a difference image between the aligned first to-be-processed eye image and the second to-be-processed eye image, the difference image being used to represent a pixel difference between the first to-be-processed eye image and the second to-be-processed eye image; and importing the difference image into a pre-trained blink detection model to obtain a blink detection label, the blink detection model being used to match the blink detection label corresponding to the difference image.

In some embodiments, the extracting two frames of face images from a video recording a face includes: dividing the video into a plurality of sub-videos according to a time window of a set time length; and combining, for each sub-video in the plurality of sub-videos, a last frame of face image in the sub-video with each face image in other face images in the sub-video respectively into the two frames of face images.

In some embodiments, the extracting a first to-be-processed eye image and a second to-be-processed eye image respectively from the two frames of face images includes: determining, respectively, a first image region and a second image region corresponding to the eye image in the two frames of face images; and extracting, based on the first image region and the second image region, the first to-be-processed eye image and the second to-be-processed eye image from the two frames of face images, respectively.

In some embodiments, the aligning the first to-be-processed eye image with the second to-be-processed eye image by a set marking point includes: setting a plurality of first marking points at set positions on the first to-be-processed eye image, wherein the set positions include a large canthus and a small canthus; setting a plurality of second marking points corresponding to the first marking points at the set positions on the second to-be-processed eye image, wherein a positional relationship between the plurality of second marking points is same to a positional relationship between the plurality of first marking points; setting the first to-be-processed eye image on a coordinate plane to obtain a plurality of first coordinates of the plurality of first marking points; and aligning the first to-be-processed eye image with the second to-be-processed eye image by adjusting a plurality of second coordinates of the plurality of second marking points of the second to-be-processed eye image on the coordinate plane to correspond to the plurality of first coordinates.

In some embodiments, the acquiring a difference image between the aligned first to-be-processed eye image and the second to-be-processed eye image includes: subtracting pixel values of pixels at same positions on the aligned first to-be-processed eye image and the second to-be-processed eye image to obtain the difference image composed of pixel value differences.

In some embodiments, the method includes constructing a blink detection model, the constructing the blink detection model includes: extracting an opened eye image and a closed eye image corresponding to the opened eye image from an opened eye image set and a closed eye image set, respectively, and constructing an eye state image combination with the opened eye image and the closed eye image, wherein the eye state image combination includes a first state image and a second state image, the first state image is an opened eye image or a closed eye image, and the second state image is an opened eye image or a closed eye image; subtracting pixel values of pixels at same positions on the first state image and the second state image of the eye state image combination to obtain a blink difference image and a non-blink difference image corresponding to the eye state image combination and composed of pixel value differences, wherein the blink difference image includes an opened-eye-closed-eye difference image and a closed-eye-opened-eye difference image, and the non-blink difference image includes an opened-eye-opened-eye difference image and a closed-eye-closed-eye difference image; acquiring feature data of the blink difference image and the non-blink difference image respectively, wherein the feature data includes a difference image area, a difference image aspect ratio, a difference image pixel number, and a difference image pixel value range; dividing the feature data into blink feature data and non-blink feature data corresponding to the blink difference image and the non-blink difference image, and setting a blink detection label and a non-blink detection label for the blink feature data and the non-blink feature data, respectively; and obtaining the blink detection model trough training, by using a machine learning method, with the blink difference image and the non-blink difference image as inputs, and the blink detection label and the non-blink detection label respectively corresponding to the blink difference image and the non-blink difference image as outputs.

In a second aspect, the embodiments of the present disclosure provide an apparatus for detecting a blink, including: an image extraction unit, configured to extract two frames of face images from a video recording a face; an image aligning unit, configured to extract a first to-be-processed eye image and a second to-be-processed eye image respectively from the two frames of face images, and align the first to-be-processed eye image with the second to-be-processed eye image through a set marking point, the marking point being used to mark a set position of an eye image; a difference image acquisition unit, configured to acquire a difference image between the aligned first to-be-processed eye image and the second to-be-processed eye image, the difference image being used to represent a pixel difference between the first to-be-processed eye image and the second to-be-processed eye image; and a blink detection label acquisition unit, configured to import the difference image into a pre-trained blink detection model to obtain a blink detection label, the blink detection model being used to match the blink detection label corresponding to the difference image.

In some embodiments, the image extraction unit includes: a video dividing subunit, configured to divide the video into a plurality of sub-videos according to a time window of a set time length; and an image extraction subunit, configured to combine, for each sub-video in the plurality of sub-videos, a last frame of face image in the sub-video with each face image in other face images in the sub-video respectively into the two frames of face images.

In some embodiments, the image aligning unit includes: an image region determination subunit, configured to determine, respectively, a first image region and a second image region corresponding to the eye images in the two frames of face images; and a to-be-processed eye image extraction subunit, configured to extract, based on the first image region and the second image region, the first to-be-processed eye image and the second to-be-processed eye image from the two frames of face images, respectively.

In some embodiments, the image aligning unit includes: a first marking point setting subunit, configured to set a plurality of first marking points at set positions on the first to-be-processed eye image, wherein the set positions include a large canthus and a small canthus; a second marking point setting subunit, configured to set a plurality of second marking points corresponding to the first marking points at the set positions on the second to-be-processed eye image, wherein a positional relationship between the plurality of second marking points is same to a positional relationship between the plurality of first marking points; a first coordinate acquisition subunit, configured to set the first to-be-processed eye image on a coordinate plane to obtain a plurality of first coordinates of the plurality of first marking points; and an aligning subunit, configured to align the first to-be-processed eye image with the second to-be-processed eye image by adjusting a plurality of second coordinates of the plurality of second marking points of the second to-be-processed eye image on the coordinate plane to correspond to the plurality of first coordinates.

In some embodiments, the difference image acquisition unit includes: subtract pixel values of pixels at same positions on the aligned first to-be-processed eye image and the second to-be-processed eye image to obtain the difference image composed of pixel value differences.

In some embodiments, the apparatus includes a blink detection model construction unit for constructing a blink detection model, the blink detection model construction unit includes: an eye state image combination construction subunit, configured to extract an opened eye image and a closed eye image corresponding to the opened eye image from an opened eye image set and a closed eye image set, respectively, and construct an eye state image combination with the opened eye image and the closed eye image, where the eye state image combination includes a first state image and a second state image, the first state image is an opened eye image or a closed eye image, and the second state image is an opened eye image or a closed eye image; a difference image acquisition subunit, configured to subtract pixel values of pixels at same positions on the first state image and the second state image of the eye state image combination to obtain a blink difference image and a non-blink difference image corresponding to the eye state image combination and composed of pixel value differences, where the blink difference image includes an opened-eye-closed-eye difference image and a closed-eye-opened-eye difference image, and the non-blink difference image includes an opened-eye-opened-eye difference image and a closed-eye-closed-eye difference image; a feature data acquisition subunit, configured to acquire feature data of the blink difference image and the non-blink difference image respectively, where the feature data includes a difference image area, a difference image aspect ratio, a difference image pixel number, and a difference image pixel value range; a feature data matching subunit, configured to divide the feature data into blink feature data and non-blink feature data corresponding to the blink difference image and the non-blink difference image, and set a blink detection label and a non-blink detection label for the blink feature data and the non-blink feature data, respectively; and a blink detection model construction subunit, configured to obtain the blink detection model trough training, by using a machine learning method, with the blink difference image and the non-blink difference image as inputs, and the blink detection label and the non-blink detection label respectively corresponding to the blink difference image and the non-blink difference image as outputs.

In a third aspect, the embodiments of the present disclosure provide a terminal device, including: one or more processors; and a storage apparatus, for storing one or more programs, the one or more programs, when executed by the one or more processors, cause the one or more processors to implement the method for detecting a blink according to the first aspect.

In a fourth aspect, the embodiments of the present disclosure provide a computer readable storage medium, storing a computer program thereon, the program, when executed by a processor, implements the method for detecting a blink according to the first aspect.

The method and apparatus for detecting a blink provided by the embodiments of the present disclosure first extracts a first to-be-processed eye image and a second to-be-processed eye image respectively from the two frames of face images, and aligns the first to-be-processed eye image with the second to-be-processed eye image through a set marking point, then acquires a difference image between the aligned first to-be-processed eye image and the second to-be-processed eye image, and finally obtains the blink detection label corresponding to the difference image through the blink detection model. The present disclosure identifies a blink process by using a difference image between two frames of face images, which improves the speed and accuracy of recognizing a blink process.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
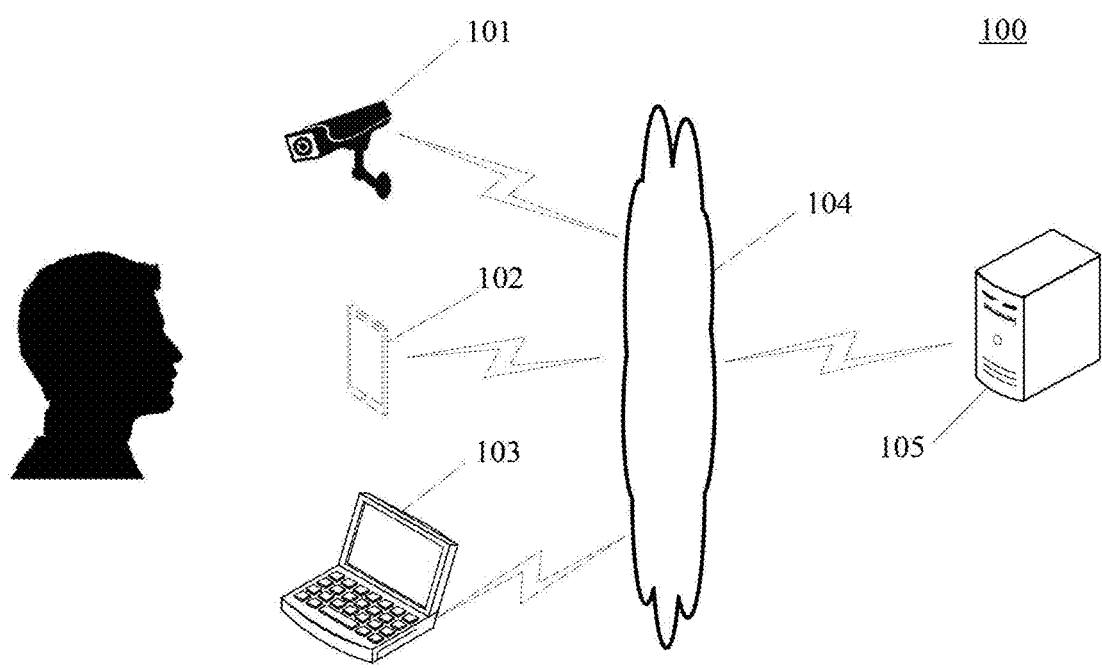
FIG. 1 is an exemplary system architecture diagram to which the present disclosure may be applied.

FIG. 1 shows an exemplary architecture of a system 100 in which a method or an apparatus for identifying a blink according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various image acquisition applications, such camera applications, video caperaturing applications, face detection security applications, or blink detection applications, may be installed on the terminal devices 101, 102 and 103.

The terminal devices 101, 102 and 103 may be various electronic devices having a display screen and supporting image and/or video capturing, including but not limited to, IP camera, surveillance camera, smart phones, tablet computers, laptop computers and desktop computers.

The server 105 may be a server providing various services, for example, a server performing the processing on the image and/or video recorded with a human face and captured by the terminal devices 101, 102 or 103. The server may perform a processing such as facial recognition, image recognition and blink detection on the received video, and return a processing result to the terminal devices.

It should be noted that the method for detecting a blink according to the embodiments of the present disclosure is generally executed by the terminal devices 101, 102 and 103. Accordingly, an apparatus for detecting a blink is generally installed on the terminal devices 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
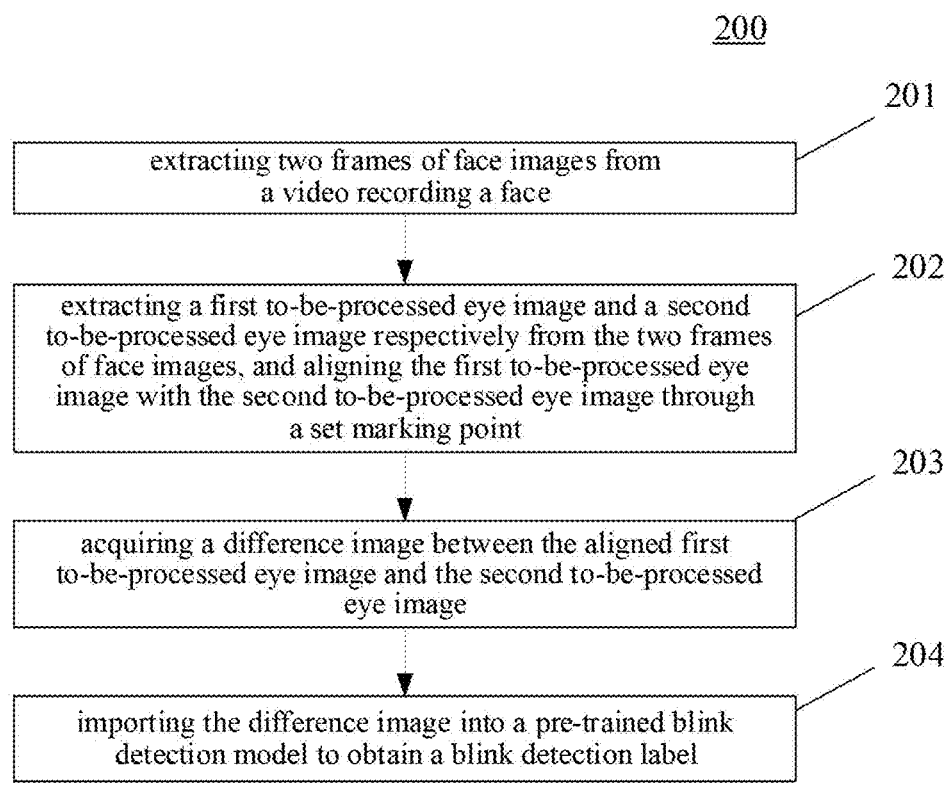
FIG. 2 is a flowchart of an embodiment of a method for detecting a blink according to the present disclosure.

With further reference to FIG. 2, a flow 200 of an embodiment of the method for detecting a blink according to the present disclosure is illustrated. The method for detecting a blink includes the following steps:

Step 201, extracting two frames of face images from a video recording a face.

In the present embodiment, the electronic device (e.g., the terminal devices 101, 102, 103 as shown in FIG. 1) on which the method for detecting a blink operate may acquire a video recording a face through a wired connection or a wireless connection. Here, the video recording a face may be a video acquired in real time (for example, a surveillance video containing a face acquired by a surveillance camera in real time), or a video acquired in non-real time (for example, a video containing a face recorded by a smartphone at a certain time in the past). It should be noted that the wireless connection may include, but is not limited to, 3G/4G connection, WiFi connection, Bluetooth connection, WiMAX connection, Zigbee connection, UWB (ultra wideband) connection, and other wireless connections known by now or to be developed in the future.

After the terminal device 101, 102, 103 receives the video recording a face, in order to detect whether there is a blink process on the face recorded by the video, two frames of face images may be extracted from the video to compare the two frames of face images to determine if there is a blink process.

In some alternative implementations of the present embodiment, the extracting two frames of face images from a video recording a face may include the following steps:

The first step, dividing the video into a plurality of sub-videos according to a time window of a set time length.

The blink cycle may be different when the human body is in different states. For example, when the human body is in a normal state, the blink cycle may be a time length; when the human body is in a fatigue state, the blink cycle may be another time length; and when safety detection is required, the blink cycle may be yet another one more time length. To this end, time windows of different time lengths may be set according to different needs, and whether there is a blink process may be determined within the corresponding time window.

Generally, the blink process takes a short time. Therefore, the video may be divided into a plurality of sub-videos according to a time window of a set time length. For example, when the total time length of the video is 10 seconds and the time length of the time window is 3 seconds, the video may be divided into 4 sub-videos of 3 seconds, 3 seconds, 3 seconds, and 1 second.

The second step, combining, for each sub-video in the plurality of sub-videos, a last frame of face image in the sub-video with each face image in other face images in the sub-video respectively into the two frames of face images.

It may be seen from the above that the time window may be set according to actual needs, and the set condition may be: there may be one or more blink processes within the time length of the time window. That is, each sub-video divided according to the time window (except for the sub-video having an insufficient time length, for example, the sub-video of 1 second described above) may basically detect whether there is a blink process. The blink process may be a process of eyes from open to closed or from closed to open, or may be a process in which the eyes are opened to varying degrees (for example, a process from squinting to staring). It may be seen that the blink process may be judged by the degrees of opening of the eyes. To this end, the present embodiment may combine the last frame of face image in each sub-video (which may also be the first frame of face image or other frame of face image in this sub-video) with each face image in the other face images in this sub-video respectively into two frames of face images, and then two frames of face images may be extracted each time. For example, a sub-video contains 5 frames of face images, which respectively are p1, p2, p3, p4, and p5. Then, the sub-video may obtain: (p1, p5), (p2, p5), (p3, p5), (p4, p5), a total of four sets of two frames of face images. Generally, the frame cycle of the face image frame is smaller than the blink cycle. Therefore, when the sub-video has a blink process, at least one set of the four sets of two frames of face images may be used to achieve the identification of the blink process.

Step 202, extracting a first to-be-processed eye image and a second to-be-processed eye image respectively from the two frames of face images, and aligning the first to-be-processed eye image with the second to-be-processed eye image through a set marking point.

The extracted two frames of face images usually contain multiple specific images. In order to detect the blink process, it is necessary to extract the first to-be-processed eye image and the second to-be-processed eye image respectively from the two frames of face images. That is, the first to-be-processed eye image and the second to-be-processed eye image are to-be-processed images containing only the eye image. During the blink process, the head may also change its position. Therefore, it is also necessary to align the first to-be-processed eye image with the second to-be-processed eye image, so that the eye images in the first to-be-processed eye image and the second to-be-processed eye image are allocated to an identical position according to the set marking point, to determine whether there is a blink process by comparing the first to-be-processed eye image with the second to-be-processed eye image. Here, the marking point is used to mark a set position on the eye image.

In some alternative implementations of the present embodiment, the extracting a first to-be-processed eye image and a second to-be-processed eye image respectively from the two frames of face images may include the following steps:

The first step, determining, respectively, a first image region and a second image region corresponding to the eye images in the two frames of face images.

The face image may include other images other than the face image. Therefore, first, it is necessary to determine the two frames of face images include a first image region and a second image region including the eye images. Alternatively, the first image region and the second image region respectively included in the two frames of face images may be identified by a face recognition method, and the first image region and the second image region may be images including only the face.

The second step, extracting, based on the first image region and the second image region, the first to-be-processed eye image and the second to-be-processed eye image from the two frames of face images, respectively.

After obtaining the first image region and the second image region, the image regions where the eyes are located in the first image region and the second image region may be further determined, thereby the first to-be-processed eye image and the second to-be-processed eye image are extracted from the first image region and the second image region.

In some alternative implementations of the present embodiment, the aligning the first to-be-processed eye image with the second to-be-processed eye image through a set marking point may include the following steps:

The first step, setting a plurality of first marking points at a set position on the first to-be-processed eye image.

In order to locate the eye image, a plurality of first marking points may be first set at set positions on the first to-be-processed eye image, and the structural feature of the eye corresponding to the eye image is marked by the plurality of first marking points. Here, the set positions include a large canthus and a small canthus, and may also include the lower edge line of the eye (the eye image may be considered to be composed of a large canthus, a small canthus, an upper edge line, and a lower edge line, the lower edge line may be the line at a lower position, or the line away from the eyebrow of the two lines connecting the large canthus and the small canthus) or the upper edge line (the upper edge line may be the line at an upper position, or the line near the eyebrow of the two lines connecting the large canthus and the small canthus) or other positions.

The second step, setting a plurality of second marking points corresponding to the first marking points at the set positions on the second to-be-processed eye image.

Typically, recognizing whether there is a blink process is for the same face (or the same living body), and the eye feature of the same face is fixed. Therefore, a plurality of second marking points corresponding to the plurality of first marking points on the first to-be-processed eye image may be set on the second to-be-processed eye image. The positional relationship between the plurality of second marking points is same to the positional relationship between the plurality of first marking points.

It should be noted that, under normal conditions, the positions of the large canthus, the small canthus, and the lower edge line are unchanged (or slightly changed), and the position of the upper edge line of the eyes may be unfixed (when opening the eyes, the upper edge line is far from the lower edge line; when closing the eyes, the upper edge line is near the lower edge line). Therefore, among the first marking points and the second marking points, the position relationships between the marking points corresponding to the large canthus, the small canthus, and the lower edge line may be the same, and the positions of the marking points corresponding to the upper edge line may be varying.

The third step, setting the first to-be-processed eye image on a coordinate plane to obtain a plurality of first coordinates of the plurality of first marking points.

In order to quantify the eye image, the first to-be-processed eye image may be set on the coordinate plane to obtain a plurality of first coordinates of the plurality of first marking points. Here, the abscissa and the ordinate of the coordinate plane are distance information.

The fourth step, aligning the first to-be-processed eye image with the second to-be-processed eye image by adjusting a plurality of second coordinates of the plurality of second marking points of the second to-be-processed eye image on the coordinate plane to correspond to the plurality of first coordinates.

Similarly, a plurality of second coordinates of the plurality of second marking points of the second to-be-processed eye image on the above coordinate plane may be obtained. Positioning the plurality of first coordinates and the plurality of second coordinates on the coordinate plane at the same time, and adjusting the positions of the second marking points (or the first marking points) corresponding to the large canthus, the small canthus, and the lower edge line on the coordinate plane until the coordinate values of the first coordinates and the second coordinates corresponding to the large canthus, the small canthus, and the lower edge line are the same or substantially the same (i.e., the first marking points and the second marking points corresponding to the large canthus, the small canthus, and the lower edge line are coincident or substantially coincident on the coordinate plane). The method of adjusting may finally realize the alignment between the first to-be-processed eye image and the second to-be-processed eye image by converting, rotating, translating or zooming the coordinates through a coordinate transformation matrix.

Step 203, acquiring a difference image between the aligned first to-be-processed eye image and the second to-be-processed eye image.

After the first to-be-processed eye image and the second to-be-processed eye image are aligned, a difference image may be obtained by the difference between pixels at corresponding positions on the first to-be-processed eye image and the second to-be-processed eye image. Here, the difference image may be used to represent a pixel difference between the first to-be-processed eye image and the second to-be-processed eye image.

In some alternative implementations of the present embodiment, the acquiring a difference image between the aligned first to-be-processed eye image and the second to-be-processed eye image may include: subtracting pixel values of pixels at a same position on the aligned first to-be-processed eye image and the second to-be-processed eye image to obtain the difference image composed of pixel value differences.

The first to-be-processed eye image and the second to-be-processed eye image are composed of pixels. Each pixel corresponds to a pixel value, different pixel values correspond to different colors, and different colors constitute an eye image. After the first to-be-processed eye image and the second to-be-processed eye image are aligned, under normal conditions, since the relative positions of the large canthus, the small canthus, and the lower edge line in different face images are substantially unchanged, the pixel values of the pixels corresponding to the large canthus, the small canthus and the lower edge line are also substantially the same. Correspondingly, the position of the upper edge line changes depending on the states of opening the eyes or closing the eyes, and the like. That is, whether blink or not depends mainly on the position of the upper edge line. Correspondingly, the difference image obtained by subtracting the pixel values of the pixels mainly represents the pixel difference between the pixel values of the pixels corresponding to the eyes, when the positions of the upper edge lines in the first to-be-processed eye image and the second to-be-processed eye image are different.

Step 204, importing the difference image into a pre-trained blink detection model to obtain a blink detection label.

After the difference image is obtained, the difference image may be imported into a pre-trained blink detection model. The blink detection model analyzes the difference image to obtain a blink detection label corresponding to the difference image. Here, the blink detection model is used to match the blink detection label corresponding to the difference image, and the blink detection label may be used to mark a blink detection result.

The blink detection model may be used to represent the correspondence relationship between the difference image and the blink detection label. For example, the blink detection model may be a correspondence table pre-established by a technician based on statistics of a large number of difference images and blink detection labels, and storing a plurality of difference images and blink detection labels; or may be a calculation formula that calculates the difference image to obtain the blink detection label, preset by a technician based on statistics on a large amount of data and stored in the electronic device. For example, the calculation formula may perform data processing on the difference image to determine the blink detection label corresponding to the difference image.

In some alternative implementations of the present embodiment, the method further includes steps of constructing a blink detection model, and the steps of constructing the blink detection model may include the following steps:

The first step, extracting an opened eye image and a closed eye image corresponding to the opened eye image from an opened eye image set and a closed eye image set, respectively, and constructing an eye state image combination with the opened eye image and the closed eye image.

The opened eye image set and the closed eye image set of the present embodiment may be manually annotated images. The eye state may include an opened eye state, a closed eye state, and a blink state. Here, the opened eye state and the closed eye state may be regarded as static, and the blink state may be regarded as dynamic. Blink may be further divided into two types: from closed eyes to opened eyes state and from opened eyes to closed eyes state. Therefore, the eye state image combination constructed by the opened eye image and the closed eye image of the present embodiment may include a first state image and a second state image. The first state image and the second state image have a sequential relationship, that is, the first state image is prior to the second state image. The first state image may be an opened eye image or a closed eye image; and the second state image may be an opened eye image or a closed eye image. Thus, the eye state image combination contains all states of the eye.

The second step, subtracting pixel values of pixels at same positions on the first state image and the second state image of the eye state image combination to obtain a blink difference image and a non-blink difference image corresponding to the eye state image combination and composed of pixel value differences.

The eye state image combination includes all states of the eye, and the pixel values of the pixels at the same position on the first state image and the second state image are subtracted to obtain a difference image between the opened eye image and the opened eye image, a difference image between the closed eye image and the closed eye image, a difference image between the opened eye image and the closed eye image, and a difference image between the closed eye image and the opened eye image. Here, the difference image between the opened eye image and the opened eye image and the difference image between the closed eye image and the closed eye image may be considered as a non-blink difference image. The difference image between the opened eye image and the closed eye image, and the difference image between the closed eye image and the opened eye image may be considered as a blink difference image. For further simplification, it may be considered that the blink difference image includes an opened-eye-closed-eye difference image and a closed-eye-opened-eye difference image, and the non-blink difference image includes an opened-eye-opened-eye difference image and a closed-eye-closed-eye difference image.

The third step, acquiring feature data of the blink difference image and the non-blink difference image respectively.

It may be seen from the above description that blink or not is mainly determined by the position of the upper edge line. When blinking, the position of the upper edge line may make the shape of the eyes different from the shape when closing and opening the eyes. To this end, feature data of the blink difference image and the non-blink difference image may be acquired, and the blink difference image and the non-blink difference image are distinguished by the feature data. Here, the feature data may include parameters such as a difference image area, a difference image aspect ratio, a difference image pixel number, and a difference image pixel value range.

The fourth step, dividing the feature data into blink feature data and non-blink feature data corresponding to the blink difference image and the non-blink difference image, and setting a blink detection label and a non-blink detection label for the blink feature data and the non-blink feature data, respectively.

The feature data may be further divided into blink feature data and non-blink feature data corresponding to the blink difference image and the non-blink difference image, respectively, based on the value range of the feature data. Then, a blink detection label and a non-blink detection label are respectively set for the blink feature data and the non-blink feature data to qualitatively annotate the images.

The fifth step, obtaining the blink detection model through training, by using a machine learning method, with the blink difference image and the non-blink difference image as inputs, and the blink detection label and the non-blink detection label respectively corresponding to the blink difference image and the non-blink difference image as outputs.

The electronic device of the present embodiment may obtain the blink detection model through training, by using a machine learning method, with the blink difference image and the non-blink difference image as inputs, and the blink detection label and the non-blink detection label respectively corresponding to the blink difference image and the non-blink difference image as outputs. Specifically, the electronic device may obtain the blink detection model through training a model for classification such as a deep learning model, a Naive Bayesian Model (NBM), or a Support Vector Machine (SVM), with the blink difference image and the blink detection label corresponding to the blink difference image as the inputs, and the non-blink difference image and the non-blink detection label corresponding to the non-blink difference image as the outputs.

Figure 3:
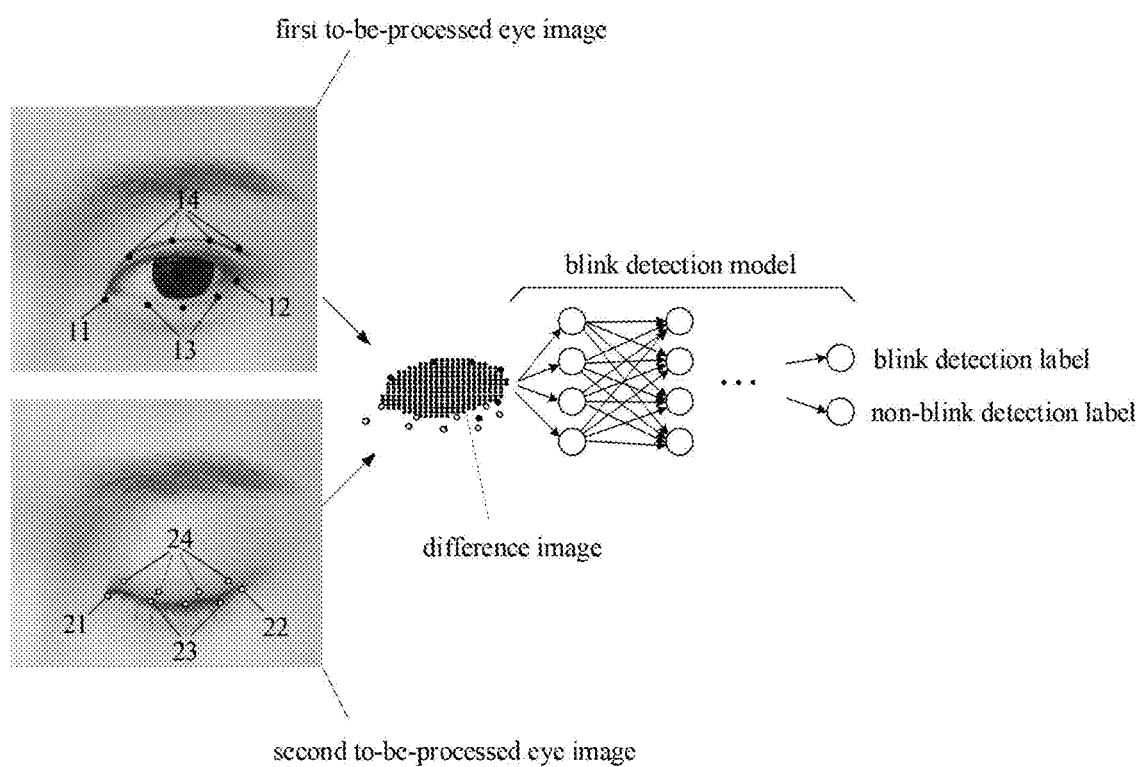
FIG. 3 is a schematic diagram of an application scenario of the method for detecting a blink according to the present disclosure.

With further reference to FIG. 3, a schematic diagram of an application scenario of the method for detecting a blink according to the present embodiment is illustrated. In the application scenario of FIG. 3, the terminal devices 101, 102, 103 first extracts two frames of face images from a video recording the face; then, respectively extracts a first to-be-processed eye image 1 and a second to-be-processed eye image 2 from the two frames of face images; then, sets marking points 11, 12, 13, 14 (11 is a marking point corresponding to the large canthus, 12 is a marking point corresponding to the small canthus, 13 is a marking point corresponding to the lower edge line, and 14 is a marking point corresponding to the upper edge line) on the first to-be-processed eye image 1, sets marking points 21, 22, 23, 24 (21 is a marking point corresponding to the large canthus, 22 is a marking point corresponding to the small canthus, 23 is a marking point corresponding to the lower edge line, and 24 is a marking point corresponding to the upper edge line) on the second to-be-processed eye image 2, sets the positions of the marking points 11, 12, 13 to respectively correspond to the positions of the marking points 21, 22, and 23 to obtain a difference image composed of the first to-be-processed eye image and the second to-be-processed eye image with the marking point 14 corresponding to the marking points 24; finally, imports the difference image into the blink detection model to obtain a blink detection label and a non-blink detection label corresponding to the difference image.

The method provided by the embodiments of the present disclosure extracts a first to-be-processed eye image and a second to-be-processed eye image respectively from an acquired two frames of face images, and aligns the first to-be-processed eye image with the second to-be-processed eye image through a set marking point, then acquires a difference image between the aligned first to-be-processed eye image and the second to-be-processed eye image, and finally obtains the blink detection label corresponding to the difference image through the blink detection model. The present disclosure identifies a blink process by using a difference image between two frames of face images, which improves the speed and accuracy of recognizing a blink process.

Figure 4:
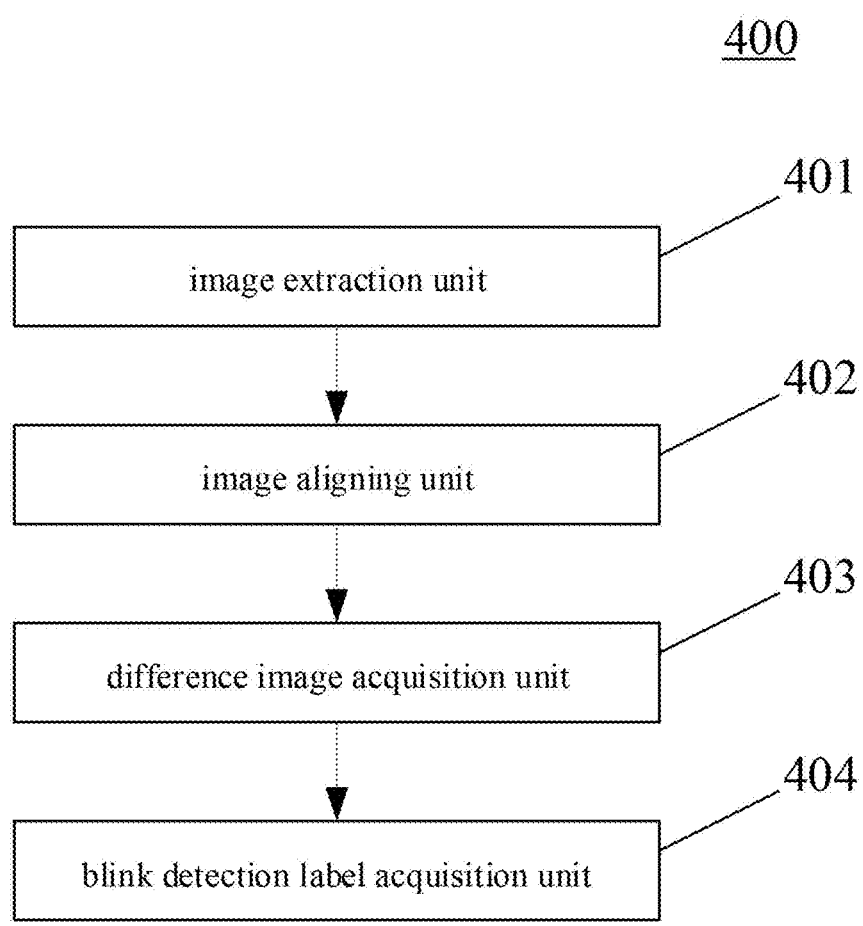
FIG. 4 is a schematic structural diagram of an embodiment of an apparatus for detecting a blink according to the present disclosure.

With further reference to FIG. 4, as an implementation to the method shown in the above figures, the present disclosure provides an embodiment of an apparatus for detecting a blink. The apparatus embodiment corresponds to the method embodiment shown in FIG. 2, and the apparatus may specifically be applied to various electronic devices.

As shown in FIG. 4, the apparatus 400 for detecting a blink of the present embodiment may include: an image extraction unit 401, an image aligning unit 402, a difference image acquisition unit 403 and a blink detection label acquisition unit 404. The image extraction unit 401 is configured to extract two frames of face images from a video recording a face. The image aligning unit 402 is configured to extract a first to-be-processed eye image and a second to-be-processed eye image respectively from the two frames of face images, and align the first to-be-processed eye image with the second to-be-processed eye image through a set marking point, the marking point being used to mark a set position of an eye image. The difference image acquisition unit 403 is configured to acquire a difference image between the aligned first to-be-processed eye image and the second to-be-processed eye image, the difference image being used to represent a pixel difference between the first to-be-processed eye image and the second to-be-processed eye image. The blink detection label acquisition unit 404 is configured to import the difference image into a pre-trained blink detection model to obtain a blink detection label, the blink detection model being used to match the blink detection label corresponding to the difference image.

In some alternative implementations of the present embodiment, the image extraction unit 401 may include: a video dividing subunit (not shown in the figure) and an image extraction subunit (not shown in the figure). The video dividing subunit is configured to divide the video into a plurality of sub-videos according to a time window of a set time length. The image extraction subunit is configured to, for each sub-video in the plurality of sub-videos, combine a last frame of face image in the sub-video with each face image in other face images in the sub-video respectively into the two frames of face images.

In some alternative implementations of the present embodiment, the image aligning unit 402 may include: an image region determination subunit (not shown in the figure) and a to-be-processed eye image extraction subunit (not shown in the figure). The image region determination subunit is configured to determine, respectively, a first image region and a second image region corresponding to the eye image in the two frames of face images. The to-be-processed eye image extraction subunit is configured to extract, based on the first image region and the second image region, the first to-be-processed eye image and the second to-be-processed eye image from the two frames of face images, respectively.

In some alternative implementations of the present embodiment, the image aligning unit 402 may include: a first marking point setting subunit (not shown in the figure), a second marking point setting subunit (not shown in the figure), a first coordinate acquisition subunit (not shown in the figure) and an aligning subunit (not shown in the figure). The first marking point setting subunit is configured to set a plurality of first marking points at set positions on the first to-be-processed eye image, where the set positions include a large canthus and a small canthus. The second marking point setting subunit is configured to set a plurality of second marking points corresponding to the first marking points at the set positions on the second to-be-processed eye image, where a positional relationship between the plurality of second marking points is same to a positional relationship between the plurality of first marking points. The first coordinate acquisition subunit is configured to set the first to-be-processed eye image on a coordinate plane to obtain a plurality of first coordinates of the plurality of first marking points. The aligning subunit is configured to align the first to-be-processed eye image with the second to-be-processed eye image by adjusting a plurality of second coordinates of the plurality of second marking points of the second to-be-processed eye image on the coordinate plane to correspond to the plurality of first coordinates.

In some alternative implementations of the present embodiment, the difference image acquisition unit 403 may include: subtract pixel values of pixels at same positions on the aligned first to-be-processed eye image and the second to-be-processed eye image to obtain the difference image composed of pixel value differences.

In some alternative implementations of the present embodiment, the apparatus 400 for detecting a blink may include a blink detection model construction unit (not shown in the figure) for constructing a blink detection model, the blink detection model construction unit may include: an eye state image combination construction subunit (not shown in the figure), a difference image acquisition subunit (not shown in the figure), a feature data acquisition subunit (not shown in the figure), a feature data matching subunit (not shown in the figure) and a blink detection model construction subunit (not shown in the figure). The eye state image combination construction subunit is configured to extract an opened eye image and a closed eye image corresponding to the opened eye image from an opened eye image set and a closed eye image set, respectively, and construct an eye state image combination with the opened eye image and the closed eye image, where the eye state image combination includes a first state image and a second state image, the first state image is an opened eye image or a closed eye image, and the second state image is an opened eye image or a closed eye image. The difference image acquisition subunit is configured to subtract pixel values of pixels at same positions on the first state image and the second state image of the eye state image combination to obtain a blink difference image and a non-blink difference image corresponding to the eye state image combination and composed of pixel value differences, wherein the blink difference image includes an opened-eye-closed-eye difference image and a closed-eye-opened-eye difference image, and the non-blink difference image includes an opened-eye-opened-eye difference image and a closed-eye-closed-eye difference image. The feature data acquisition subunit is configured to acquire feature data of the blink difference image and the non-blink difference image respectively, where the feature data includes a difference image area, a difference image aspect ratio, a difference image pixel number, and a difference image pixel value range. The feature data matching subunit is configured to divide the feature data into blink feature data and non-blink feature data corresponding to the blink difference image and the non-blink difference image, and set a blink detection label and a non-blink detection label for the blink feature data and the non-blink feature data, respectively. The blink detection model construction subunit is configured to obtain the blink detection model trough training, by using a machine learning method, with the blink difference image and the non-blink difference image as inputs, and the blink detection label and the non-blink detection label respectively corresponding to the blink difference image and the non-blink difference image as outputs.

The present embodiment also provides a terminal device, including: one or more processors; and a storage apparatus, for storing one or more programs, the one or more programs, when executed by the one or more processors, cause the one or more processors to implement the method for detecting a blink.

The present embodiment also provides a computer readable storage medium, storing a computer program thereon, the program, when executed by a processor, implements the method for detecting a blink.

Figure 5:
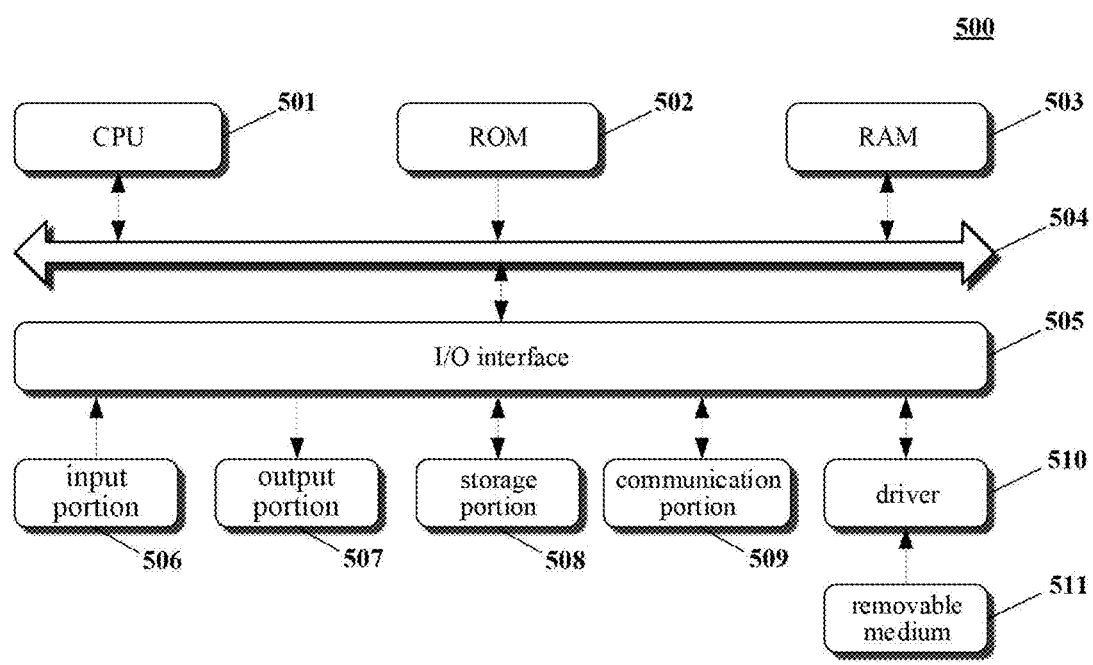
FIG. 5 is a schematic structural diagram of a computer system adapted to implement a terminal device of the embodiments of the present disclosure.

Referring to FIG. 5, a schematic structural diagram of a computer system 500 adapted to implement the terminal devices of the embodiments of the present disclosure is shown. The terminal device shown in FIG. 5 is merely an example and should not impose any limitation on the functionality and usage range of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an image extraction unit, an image aligning unit, a difference image acquisition unit, and a blink detection label acquisition unit, where the names of these units or modules do not in some cases constitute a limitation to such units or modules themselves. For example, the blink detection label acquisition unit may also be described as "a unit for acquiring a blink detection label."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: extract two frames of face images from a video recording a face; extract a first to-be-processed eye image and a second to-be-processed eye image respectively from the two frames of face images, and align the first to-be-processed eye image with the second to-be-processed eye image through a set marking point, the marking point being used to mark a set position of an eye image; acquire a difference image between the aligned first to-be-processed eye image and the second to-be-processed eye image, the difference image being used to represent a pixel difference between the first to-be-processed eye image and the second to-be-processed eye image; and import the difference image into a pre-trained blink detection model to obtain a blink detection label, the blink detection model being used to match the blink detection label corresponding to the difference image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting a blink, the method comprising:
   extracting two frames of face images from a video recording a face;
   extracting a first to-be-processed eye image and a second to-be-processed eye image respectively from the two frames of face images, and aligning the first to-be-processed eye image with the second to-be-processed eye image through a set marking point, the marking point being used to mark a set position of an eye image;
   acquiring a difference image between the aligned first to-be-processed eye image and the second to-be-processed eye image, the difference image being used to represent a pixel difference between the first to-be-processed eye image and the second to-be-processed eye image; and importing the difference image into a pre-trained blink detection model to obtain a blink detection label, the blink detection model being used to match the blink detection label corresponding to the difference image.

2. The method according to claim 1, wherein the extracting two frames of face images from a video recording a face comprises:

dividing the video into a plurality of sub-videos according to a time window of a set time length; and combining, for each sub-video in the plurality of sub-videos, a last frame of face image in the sub-video with each face image in other face images in the sub-video respectively into the two frames of face images.

3. The method according to claim 1, wherein the extracting a first to-be-processed eye image and a second to-be-processed eye image respectively from the two frames of face images comprises:

determining, respectively, a first image region and a second image region corresponding to the eye images in the two frames of face images; and extracting, based on the first image region and the second image region, the first to-be-processed eye image and the second to-be-processed eye image from the two frames of face images, respectively.

4. The method according to claim 1, wherein the aligning the first to-be-processed eye image with the second to-be-processed eye image by a set marking point comprises:

setting a plurality of first marking points at set positions on the first to-be-processed eye image, wherein the set positions comprise a large canthus and a small canthus;

setting a plurality of second marking points corresponding to the first marking points at the set positions on the second to-be-processed eye image, wherein a positional relationship between the plurality of second marking points is same to a positional relationship between the plurality of first marking points;

setting the first to-be-processed eye image on a coordinate plane to obtain a plurality of first coordinates of the plurality of first marking points; and aligning the first to-be-processed eye image with the second to-be-processed eye image by adjusting a plurality of second coordinates of the plurality of second marking points of the second to-be-processed eye image on the coordinate plane to correspond to the plurality of first coordinates.

5. The method according to claim 1, wherein the acquiring a difference image between the aligned first to-be-processed eye image and the second to-be-processed eye image comprises:

subtracting pixel values of pixels at same positions on the aligned first to-be-processed eye image and the second to-be-processed eye image to obtain the difference image composed of pixel value differences.

6. The method according to claim 1, wherein the method comprises constructing a blink detection model, and the constructing the blink detection model comprises:

extracting an opened eye image and a closed eye image corresponding to the opened eye image from an opened eye image set and a closed eye image set, respectively, and constructing an eye state image combination with the opened eye image and the closed eye image, the eye state image combination comprising a first state image and a second state image, the first state image being an opened eye image or a closed eye image, and the second state image being an opened eye image or a closed eye image;

subtracting pixel values of pixels at same positions on the first state image and the second state image of the eye state image combination to obtain a blink difference image and a non-blink difference image corresponding to the eye state image combination and composed of pixel value differences, wherein the blink difference image comprises an opened-eye-closed-eye difference image and a closed-eye-opened-eye difference image, and the non-blink difference image comprises an opened-eye-opened-eye difference image and a closed-eye-closed-eye difference image;

acquiring feature data of the blink difference image and the non-blink difference image respectively, the feature data comprising a difference image area, a difference image aspect ratio, a difference image pixel number, and a difference image pixel value range;

dividing the feature data into blink feature data and non-blink feature data corresponding to the blink difference image and the non-blink difference image, and setting a blink detection label and a non-blink detection label for the blink feature data and the non-blink feature data respectively; and obtaining the blink detection model trough training, by using a machine learning method, with the blink difference image and the non-blink difference image as inputs, and the blink detection label and the non-blink detection label respectively corresponding to the blink difference image and the non-blink difference image as outputs.

7. An apparatus for detecting a blink, the apparatus comprising:

at least one processor; and a memory storing instructions, the instructions when executed by the at least one processor, cause the at least one processor to perform operations, the operations comprising:

extracting two frames of face images from a video recording a face;

extracting a first to-be-processed eye image and a second to-be-processed eye image respectively from the two frames of face images, and aligning the first to-be-processed eye image with the second to-be-processed eye image through a set marking point, the marking point being used to mark a set position of an eye image;

acquiring a difference image between the aligned first to-be-processed eye image and the second to-be-processed eye image, the difference image being used to represent a pixel difference between the first to-be-processed eye image and the second to-be-processed eye image; and importing the difference image into a pre-trained blink detection model to obtain a blink detection label, the blink detection model being used to match the blink detection label corresponding to the difference image.

8. The apparatus according to claim 7, wherein the extracting two frames of face images from a video recording a face comprises:

dividing the video into a plurality of sub-videos according to a time window of a set time length; and combining, for each sub-video in the plurality of sub-videos, a last frame of face image in the sub-video with each face image in other face images in the sub-video respectively into the two frames of face images.

9. The apparatus according to claim 7, wherein the extracting a first to-be-processed eye image and a second to-be-processed eye image respectively from the two frames of face images comprises:
  determining, respectively, a first image region and a second image region corresponding to the eye images in the two frames of face images; and
  extracting, based on the first image region and the second image region, the first to-be-processed eye image and the second to-be-processed eye image from the two frames of face images, respectively.

10. The apparatus according to claim 7, wherein t the aligning the first to-be-processed eye image with the second to-be-processed eye image by a set marking point comprises:
  setting a plurality of first marking points at set positions on the first to-be-processed eye image, wherein the set positions comprise a large canthus and a small canthus;
  setting a plurality of second marking points corresponding to the first marking points at the set positions on the second to-be-processed eye image, wherein a positional relationship between the plurality of second marking points is same to a positional relationship between the plurality of first marking points;
  setting the first to-be-processed eye image on a coordinate plane to obtain a plurality of first coordinates of the plurality of first marking points; and
  aligning the first to-be-processed eye image with the second to-be-processed eye image by adjusting a plurality of second coordinates of the plurality of second marking points of the second to-be-processed eye image on the coordinate plane to correspond to the plurality of first coordinates.

11. The apparatus according to claim 7, wherein the acquiring a difference image between the aligned first to-be-processed eye image and the second to-be-processed eye image comprises:
  subtracting pixel values of pixels at same positions on the aligned first to-be-processed eye image and the second to-be-processed eye image to obtain the difference image composed of pixel value differences.

12. The apparatus according to claim 7, wherein the operations comprise constructing a blink detection model, and the constructing the blink detection model comprises:
  extracting an opened eye image and a closed eye image corresponding to the opened eye image from an opened eye image set and a closed eye image set, respectively, and constructing an eye state image combination with the opened eye image and the closed eye image, the eye state image combination comprising a first state image and a second state image, the first state image being an opened eye image or a closed eye image, and the second state image being an opened eye image or a closed eye image;
  subtracting pixel values of pixels at same positions on the first state image and the second state image of the eye state image combination to obtain a blink difference image and a non-blink difference image corresponding to the eye state image combination and composed of pixel value differences, wherein the blink difference image comprises an opened-eye-closed-eye difference image and a closed-eye-opened-eye difference image, and the non-blink difference image comprises an opened-eye-opened-eye difference image and a closed-eye-closed-eye difference image;
  acquiring feature data of the blink difference image and the non-blink difference image respectively, the feature data comprising a difference image area, a difference image aspect ratio, a difference image pixel number, and a difference image pixel value range;
  dividing the feature data into blink feature data and non-blink feature data corresponding to the blink difference image and the non-blink difference image, and setting a blink detection label and a non-blink detection label for the blink feature data and the non-blink feature data, respectively; and
  obtaining the blink detection model trough training, by using a machine learning method, with the blink difference image and the non-blink difference image as inputs, and the blink detection label and the non-blink detection label respectively corresponding to the blink difference image and the non-blink difference image as outputs.

13. A non-transitory computer readable storage medium storing a computer program, wherein the computer program, when executed by a processor, cause the processor to perform operations, the operations comprising:
  extracting two frames of face images from a video recording a face;
  extracting a first to-be-processed eye image and a second to-be-processed eye image respectively from the two frames of face images, and aligning the first to-be-processed eye image with the second to-be-processed eye image through a set marking point, the marking point being used to mark a set position of an eye image;
  acquiring a difference image between the aligned first to-be-processed eye image and the second to-be-processed eye image, the difference image being used to represent a pixel difference between the first to-be-processed eye image and the second to-be-processed eye image; and
  importing the difference image into a pre-trained blink detection model to obtain a blink detection label, the blink detection model being used to match the blink detection label corresponding to the difference image.

* * * * *

UNITED STATES PATENT AND TRADEMARK OFFICE
CERTIFICATE OF CORRECTION

PATENT NO. : 10,691,940 B2  
APPLICATION NO. : 16/129356  
DATED : June 23, 2020  
INVENTOR(S) : Hong Page 1 of 1

It is certified that error appears in the above-identified patent and that said Letters Patent is hereby corrected as shown below:

On the Title Page

At Item (30) (Foreign Application Priority Data), please delete "(CN) 2017 1 11475427" and insert --(CN) 2017 1 11478427-- therefor.

Signed and Sealed this  
Thirteenth Day of October, 2020

Andrei Iancu  
*Director of the United States Patent and Trademark Office*